United States Patent [19]
Odaka

[11] Patent Number: 4,748,520
[45] Date of Patent: * May 31, 1988

[54] METHOD FOR RECORDING A DIGITAL INFORMATION SIGNAL AND TRACKING PILOT SIGNALS AT DIFFERENT LOCATIONS IN THE TRACK

[75] Inventor: Kentaro Odaka, Kawasaki, Japan

[73] Assignee: Sony Corporation, Tokyo, Japan

[*] Notice: The portion of the term of this patent subsequent to May 12, 2004 has been disclaimed.

[21] Appl. No.: 19,936

[22] Filed: Feb. 27, 1987

Related U.S. Application Data

[63] Continuation of Ser. No. 560,958, Dec. 13, 1983, Pat. No. 4,665,447.

[30] Foreign Application Priority Data

Dec. 13, 1982 [JP] Japan ................... 57-222298

[51] Int. Cl.[4] ............... G11B 5/02; G11B 5/024; G11B 27/10; G11B 5/09
[52] U.S. Cl. .......................... 360/77; 360/78; 360/21
[58] Field of Search ............. 360/77, 78, 39, 32, 360/19.1, 21, 18

[56] References Cited

U.S. PATENT DOCUMENTS

| | | | |
|---|---|---|---|
| 4,454,549 | 6/1984 | Pennington | 360/77 |
| 4,528,605 | 7/1985 | Hiraguri | 360/77 |
| 4,544,966 | 10/1985 | Taniguchi et al. | 360/75 |
| 4,656,539 | 4/1987 | Sugiki et al. | 360/77 |
| 4,665,447 | 5/1987 | Odaka | 360/77 |

Primary Examiner—Raymond F. Cardillo
Assistant Examiner—Alyssa Bowler
Attorney, Agent, or Firm—Lewis H. Eslinger

[57] ABSTRACT

A method and an apparatus for recording a digital information signal are disclosed in which a signal to be recorded is pulse-code-modulated (PCM) and the PCM signal is recorded on a recording medium by a rotary head as a slant tracks with no guard band between adjacent tracks and then reproduced therefrom. In this case, a tracking pilot signal is recorded on a part of each track independently of the PCM signal. The recording positions of the pilot signals on respective tracks are determined in such a manner that when succeeding three tracks are seen from the direction perpendicular to the tracing direction of the rotary head, they are not superimposed upon one another. Upon reproducing, when the record track is traced by the rotary head, the pilot signals from both tracks adjacent to the track to be traced are reproduced and a tracking signal is generated from the reproduced outputs whereby a playback rotary head traces the record track.

2 Claims, 3 Drawing Sheets

METHOD FOR RECORDING A DIGITAL INFORMATION SIGNAL AND TRACKING PILOT SIGNALS AT DIFFERENT LOCATIONS IN THE TRACK

This is a continuation of application Ser. No. 06/560,958, filed Dec. 13, 1983, now U.S. Pat. No. 4,665,447.

BACKGROUND OF THE INVENTION

1. Field of the Invention

The present invention relates generally to a method and an apparatus for recording a digital information signal and more particularly is directed to a method and an apparatus for recording a digital information signal on a recording medium by using a rotary magnetic head.

2. Description of the Prior Art

It is proposed in the art that when a video signal and an audio signal are recorded on a magnetic tape as one slant track at each unit time by using a rotary head assembly of helical scan type and then reproduced therefrom, the video signal and the audio signal are pulse-code-modulated (PCM) and then recorded and reproduced. The reason for this is that if the video signal and so on are pulse-code-modulated, recording and reproducing with high information accuracy becomes possible.

In this case, in a conventional video tape recorder (VTR), tracking control is provided so as to make the rotary head trace correctly the record track upon reproducing. That is, upon recording, tracking control is carried out using a control signal which is recorded along one edge of the magnetic tape in its width direction by a stationary or fixed magnetic head so that when reproduced by the fixed head the reproduced control signal and the rotary phase of the rotary head have a constant phase relation therebetween.

In this method, however, a special fixed magnetic head must be provided for the tracking control. When the recording and reproducing apparatus is desired to be made small in size, such fixed magnetic head causes a disadvantage in view of the mounting place thereof and so on.

Therefore, as a tracking control method without using the fixed head, there is proposed the following method.

In this method, for example, an analog video signal is recorded and reproduced under a so-called successive state (under the state that a guard band is not formed between the adjacent tracks), in which a tracking pilot signal is recorded by the rotary head on the track on which the video signal is recorded. In this case, the pilot signal exists in the low frequency band side wherein the record signal of the video signal does not exist in view of the frequency spectrum so that upon reproducing, the pilot signal can be separated with ease.

This method, however, employs a signal with a relatively low frequency as the pilot signal so that it is rather difficult to erase the pilot signal. Therefore, when a signal, while erasing the signal which was previously recorded, is newly recorded on that portion, there occurs a disadvantage that the preceding recorded signal remains. Depending on the modulation system, when the information signal to be recorded has a spectrum in the low frequency band just like the PCM signal, it is quite difficult to separate the pilot signal. Furthermore, since the frequencies of four kinds are used as the pilot signal, the construction of the circuit becomes complicated.

OBJECTS AND SUMMARY OF THE INVENTION

It is an object of the present invention to provide an improved method and apparatus for recording a digital information signal.

It is another object of the present invention to provide an improved method and apparatus for recording a digital information signal in which a tracking control pilot signal is recorded.

According to one aspect of the present invention, there is provided a method for recording a digital information signal in which an information signal is digitized and then recorded on a recording medium by a rotary head comprising the steps of:

recording said digitized information signal on a certain area of a slant track which is formed on said recording medium without a guard band; and recording a tracking pilot signal on other area of said slant track independently of said digitized information signal wherein recording positions of said pilot signal on adjacent three tracks are determined so that the signals are not sequentially encountered on any three adjacent slant tracks in a direction perpendicular to a tracking direction of said rotary head.

According to another aspect of the present invention, there is provided an apparatus for recording a digital information signal in which an information signal is digitized and then recorded on a recording medium by a rotary head comprising:

means for recording said digitized information signal on a certain area of a slant track which is formed on said recording medium without a guard band; and means for recording a tracking pilot signal on other area of said slant track independently of said digital information signal wherein recording positions of said pilot signal on adjacent three tracks are determined so that the signals are not sequentially encountered on any three adjacent slant tracks in a direction perpendicular to a tracking direction of said rotary head.

The other objects, features and advantages of the present invention will become apparent from the following description taken in conjunction with the accompanying drawings through which the like references designate the same elements and parts.

BRIEF DESCRIPTION OF THE DRAWINGS

FIGS. 6A to 6C are respectively waveform diagrams useful for the explanation thereof.

DESCRIPTION OF THE PREFERRED EMBODIMENT

Before describing the present invention, a conventional tracking control method will be described with reference to FIGS. 1 and 2.

In this example, two rotary heads HA and HB, each having a different so-called azimuth angle, are located with an angular distance of 180° therebetween. In this case, the pilot signals with four frequencies, for example, $f_1 = 100$ kHz, $f_2 = 115$ kHz, $f_3 = 160$ kHz and $f_4 = 145$ kHz are used. As shown in FIG. 1, by the use of one rotary head HA, not shown, every other tracks $T_1$ and $T_3$ are sequentially formed on which an FM-modulated video signal is recorded. The pilot signal with the frequency $f_1$ is recorded on the track $T_1$ being superimposed on the recorded video signal, while the pilot signal with the frequency $f_3$ is recorded on the track $T_3$ being superimposed upon the recorded video signal. On the other hand, by the other rotary head HB, every other tracks $T_2$ and $T_4$ are sequentially formed on which the FM-modulated video signal is recorded. The pilot signal with the frequency $f_2$ is recorded on the track $T_2$ being superimposed on the recorded video signal, while the pilot signal with the frequency $f_4$ is recorded on the track $T_4$ being superimposed upon the recorded video signal.

These tracks $T_1$, $T_2$, $T_3$ and $T_4$ are formed under being a so-called successive state (having no guard band between adjacent tracks).

The tracking control upon reproducing will be carried out as follows. In this case, since approximately the same tracking control is performed for the respective two rotary heads HA and HB, the control operation for one head, for example, the head HB will be described with reference to FIG. 2.

When the rotary head HB correctly traces the track $T_2$ or $T_4$, the just tracking state of the head HB is presented. As shown in FIG. 2, the output reproduced by this head HB is supplied through a playback amplifier 1 to a low pass filter 2 from which only a pilot signal in the low frequency band side is derived. This low frequency band component is supplied to a multiplying circuit 3 in which it is multiplied with the signal having the frequency $f_2$ from an oscillator 4.

Figure 1:
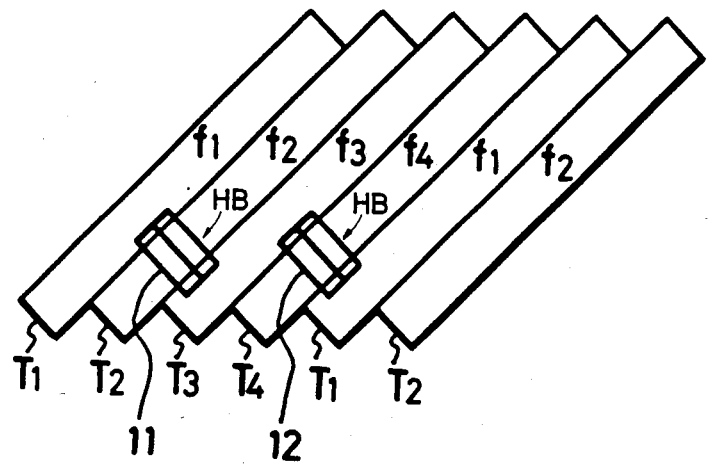
FIG. 1 is a diagram showing a recording track pattern by an example of the conventional tracking control system.
Figure 2:
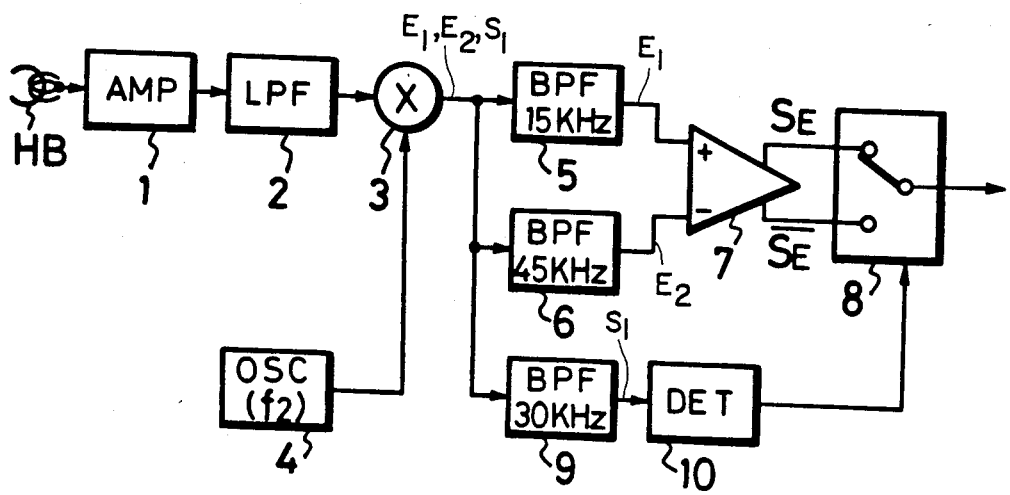
FIG. 2 is a systematic block diagram showing an example of the conventional tracking control system.

When the head HB traces the track $T_2$ as shown by a reference numeral 11 in FIG. 1, generated from the multiplying circuit 3 are a signal $E_1$ with the frequency of $f_2 - f_1 = 15$ kHz and a signal $E_2$ with the frequency of $f_3 - f_2 = 45$ kHz. Meanwhile, when the head HB traces the track $T_4$ as shown by a reference numeral 12 in FIG. 1, from the multiplying circuit 3 generated is a signal $S_I$ with the frequency of $f_4 - f_2 = 30$ kHz in addition to the signal $E_1$ with the frequency of $f_2 - f_1 = 15$ kHz and the signal $E_2$ with the frequency of $f_3 - f_2 = 45$ kHz.

The signals $E_1$ and $E_2$ are the reproduced outputs of the pilot signals from the adjacent tracks which are not to be traced by the head HB. As will be clear from FIG. 1, if the reproduced output levels of both the signals $E_1$ and $E_2$ are equal to each other, the head HB correctly traces the tracks $T_2$ and $T_4$. Accordingly, if the tracking control is carried out so as to make the reproduced output levels of the signals $E_1$ and $E_2$ equal, the just tracking state can be established.

Therefore, the output from the multiplying circuit 3 is supplied to band-pass filters 5 and 6. From the band-pass filter 5 is derived the signal $E_1$ with the frequency of 15 kHz, while from the band-pass filter 6 is derived the signal $E_2$ with the frequency of 45 kHz. The signals $E_1$ and $E_2$ are respectively supplied to one input terminal and the other input terminal of a differential amplifier 7 which then produces an output of a difference between both the signals $E_1$ and $E_2$. By the output from this differential amplifier 7, a capstan motor, for example, is controlled in such a manner that the transport of the tape is controlled so as to reduce the output of difference from the differential amplifier 7 to zero.

In this case, however, the tracks $T_2$ and $T_4$ have the opposite frequency relations of the pilot signals from the adjacent tracks in the left and right sides. Therefore, each time when the head HB traces the track $T_2$ or $T_4$, the tracking control direction must be reversed. Namely, when the head HB traces the tracks $T_2$, the output of the pilot signal on the track $T_2$ is not delivered from the multiplying circuit 3, while when the head HB traces the track $T_4$, the signal $S_I$ with the frequency of $f_4 - f_2 = 30$ kHz is obtained therefrom as mentioned before. Therefore, when this signal $S_I$ is detected, the direction of the tracking control is reversed.

Outputs $S_E$ and $\overline{S_E}$, which are opposite in polarity, from the differential amplifier 7 are supplied one and the other output terminals of a switching circuit 8. On the other hand, the output from the multiplying circuit 3 is also supplied to a band pass filter 9 from which a signal component of 30 kHz is derived. This signal component is supplied to a detecting circuit 10 thereby detected. When the signal $S_I$ with the frequency of 30 kHz is detected in the detecting circuit 10, the switching circuit 8 is changed in position to deliver the output of the opposite polarity by which the capstan motor is controlled.

In the case of the other rotary head HA, if the signal with the frequency $f_1$ from the oscillating circuit 4 is similarly supplied to the multiplying circuit 3, the signal with the frequency $f_2 - f_1 = 15$ kHz and the signal with the frequency $f_4 - f_1 = 45$ kHz are obtained as the pilot signal outputs of the adjacent tracks. Thus, the tracking control is carried out so as to reduce the difference between both the pilot signal outputs to zero. In this case, when a signal with the frequency $f_3 - f_1 = 60$ kHz is detected, the direction of the tracking control is reversed.

When the tracking control is carried out for one rotary head, the one rotary head has a constant relation relative to the other head so that it is needless to carry out the tracking control for the other rotary head.

This previously proposed method, however, uses the signal with the relatively low frequency as the pilot signal so that the recorded pilot signal is rather difficult to erase. Therefore, in such a case that while erasing the signal recorded previously on a portion, a new signal is recorded on the very same portion there occurs a disadvantage that the preceding recorded signal remains. Furthermore, depending on the modulation system, when the information signal to be recorded has the frequency spectrum in the low frequency band just like the PCM signal, it is quite difficult to separate the pilot signal from other signals. In addition, since the signals with four different frequencies are used as the pilot signals, the construction of the circuit becomes complicated.

Now, an embodiment of the method and apparatus for recording a digital information signal according to the present invention will hereinafter be described with reference to FIGS. 3 to 6.

Figure 3:
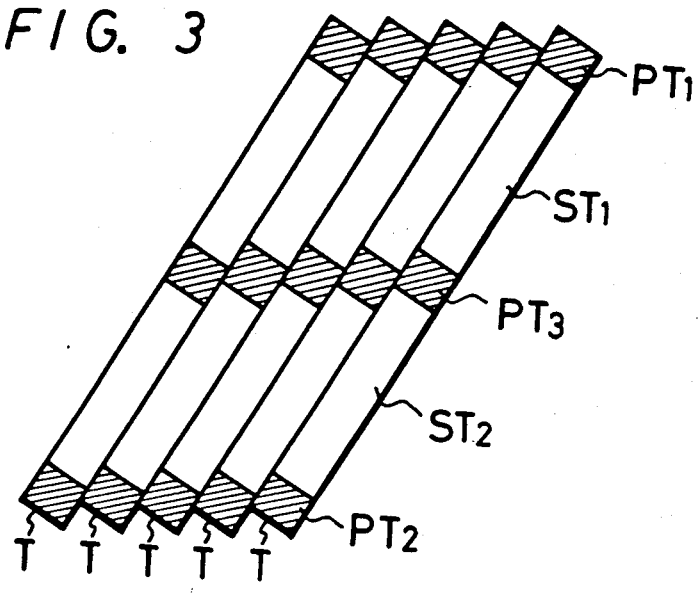
FIG. 3 is a diagram showing a recording track pattern by an embodiment of a tracking control system according to the present invention.

In the present invention, a PCM signal is timebase-compressed thereby to form a recording area on a record track for a tracking pilot signal. According to the embodiment of the invention, as shown in FIG. 3, pilot signal areas $PT_1$ and $PT_2$ are formed at both ends of each record track T in the longitudinal direction thereof. At the same time, a PCM signal to be recorded as one track is halved so that one PCM signal is recorded on a PCM area $ST_1$ and the other PCM signal is recorded on a PCM area $ST_2$, respectively. And, also a pilot signal area $PT_3$ is formed between both the areas $ST_1$ and $ST_2$ of each track T.

Figure 4:
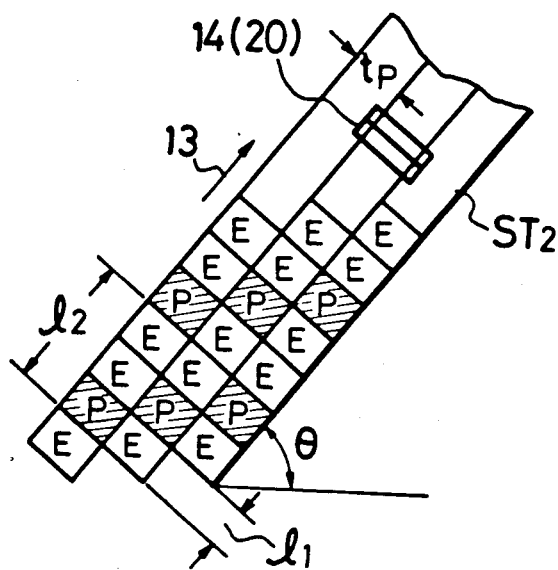
FIG. 4 is a diagram useful for explaining the details thereof.

On each of the pilot signal areas $PT_1$, $PT_2$ and $PT_3$ is recorded a pilot signal with constant frequency a pattern shown in FIG. 4. In this case, the frequency of this pilot signal is selected to be a value having a relatively small azimuth loss, for example, approximately 100 kHz to 500 kHz.

In FIG. 4, reference letters P designate the pilot signals which are arranged so that the signals are not sequentially encountered on any three adjacent slant tracks in a direction perpendicular to the tracing direction of the head shown by an arrow 13. Therefore, even if the rotary head traces the three tracks as shown in the figure, the reproduced output of the pilot signal P from each track is produced individually and not combined with the pilot signal of an adjacent track. In order to realize this operation, when the pitch or width of the track T is taken as $t_p$ and the inclination angle of the track T relative to the longitudinal direction of a magnetic tape is taken as $\theta$, a distance $l_1$ between the recording positions of the pilot signals P in the adjacent tracks in one tracing direction of the head must be selected as more than at least $t_p/\tan\theta$. When a plurality of pilot signals P are recorded on the respective areas $PT_1$, $PT_2$ and $PT_3$ of one track as shown in FIG. 4, a distance $l_2$ between the recording positions of the one and next pilot signals in the tracing direction of the head in each track is selected as a value which satisfies $l_2=3l_1$.

In FIG. 4, reference letter E represents a signal for erasing the pilot signal P. Namely, when the pilot signal P is recorded under the condition mentioned as above, between the adjacent tracks the portion adjoining the recorded portion of the pilot signal P of one track is the portion of the adjacent track on which no pilot signal is recorded. Newly recorded tracks are not always coincident with previously recorded tracks. Thus, if no signal is recorded in a track where there is no pilot signal, some of the previously recorded pilot signal will remain in the area that should not have any signal. Therefore, in view of the succeeding recording, the signal E which can erase the pilot signal P is recorded where the pilot signal P for that track is not to be recorded.

The tracking control which employs this pilot signal P will be described now.

Let it be assumed that when the rotary head 20 traces the center track in FIG. 4, the rotary head 20 traces across three tracks under the state as shown by reference numeral 14 shown in FIG. 4.

Figure 5:
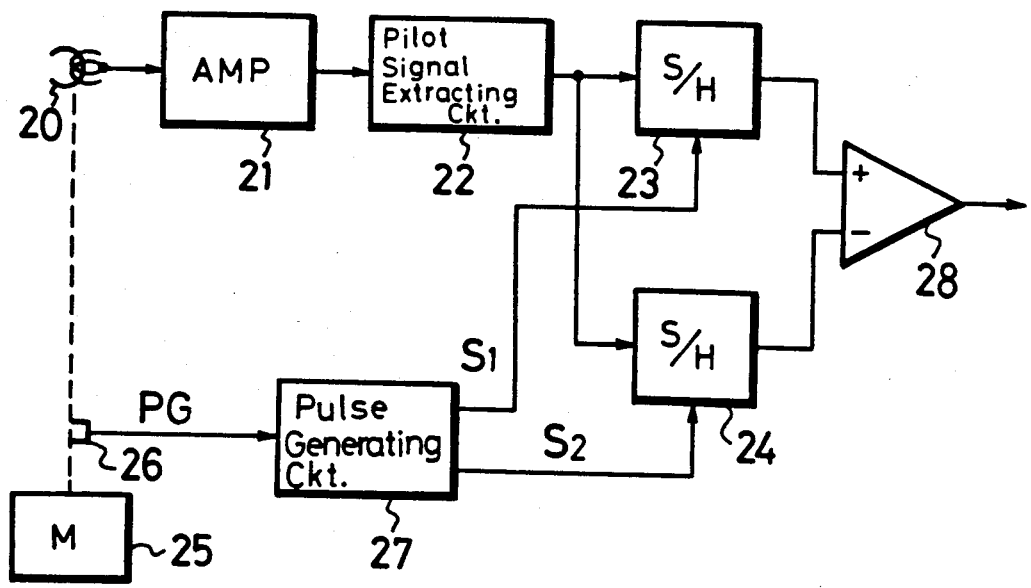
FIG. 5 is a systematic block diagram showing an embodiment of the tracking control system according to the present invention.
Figure 6A:
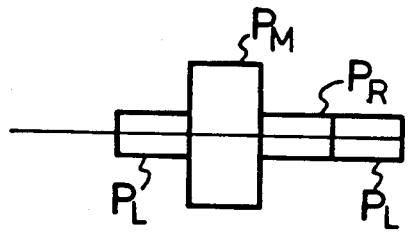
Figure 6A:
Figure 6A:

FIG. 5 is a block diagram showing an example of the tracking control circuit according to the present invention. The output from the rotary head 20 is supplied through a playback amplifier 21 to a pilot signal extracting circuit 22 from which only the reproduced output of the pilot signal P is derived. This pilot signal extracting circuit 22 may be constructed by a tank circuit which is tuned to only the pilot signal frequency. As shown in FIG. 6A, the output of the pilot signals P derived from this extracting circuit 22 contains a pilot signal output $P_M$ which appears from the center track and has a large level and pilot signal outputs $P_R$ and $P_L$ which appear from the right-side and left-side tracks and have a small level, respectively. The sequential order under which these outputs $P_M$, $P_R$ and $P_L$ appear always becomes the same when the rotary head 20 traces the respective tracks.

The output from the pilot signal extracting circuit 22 is supplied to sample and hold circuits 23 and 24.

On the other hand, a pulse PG delivered from a pulse generator 26 at each revolution of a drive motor 25 for driving the rotary head 20 and indicating the rotary phase of the rotary head 20 is supplied to a pulse generating circuit 27. In the pulse generating circuit 27, based on the pulse PG, there are respectively generated a signal $S_1$ (see FIG. 6B) at the time when the head 20 traces the pilot signal portion of the right-hand track and a signal $S_2$ (see FIG. 6C) at the time when the head 20 traces the pilot signal portion of the left-hand track. The signal $S_1$ is supplied to the sample and hold circuit 23, while the signal $S_2$ is supplied to the sample and hold circuit 24, respectively. Consequently, the sample and hold circuit 23 generates the sample and hold output of a pilot signal reproduced output $P_R$ which is derived from the right-hand track, while the sample and hold circuit 24 generates the sample and hold output of a pilot signal reproduced output $P_L$ which is derived from the left-hand track, respectively. And, both the sample and hold outputs are supplied to one input terminal and the other input terminal of a differential amplifier 28, respectively. Accordingly, from the differential amplifier 28 is produced a difference output between both the inputs thereto which then is delivered to a capstan motor not shown. Thus, so the capstan motor is controlled such that the transport amount of the tape is made so as to reduce the level difference between the outputs $P_R$ and $P_L$ to zero, namely, when the head 20 traces the center track, the head 20 traces the tracks at both sides of the center track by an equal amount.

In the above embodiment, all pilot signals P have the same frequency. In the case where a plurality of heads having different azimuth angles are employed, it is possible to use a pilot signal with a different frequency for each head with a different azimuth angle.

Without changing the frequency of the pilot signal for each head which has the different azimuth angle, the mistracking can be avoided by the following methods. According to one method, at the time when the playback is started, prior to the actual playback, the output levels of the high frequency signals which are the outputs reproduced by, for example, two heads, each having a different azimuth angle, are inspected. In other words, each head is aligned with its corresponding azimuth angle recorded track by checking the high frequency azimuth loss in advance of actual reproduction.

According to the other method, upon reproducing, the high frequency outputs from the respective heads are inspected at all times. When the level of the high frequency output becomes less than a predetermined level (at this time, the head scan the track which has the different azimuth angle), an error voltage is added to the tracking signal of the invention by which in the case of two heads, the tracking positions thereof are displaced by one track pitch at maximum.

Moreover, three record areas of the pilot signal do not have to be provided as in the example shown in FIG. 3 but at least one record area is sufficient. However, when as in the example shown in FIG. 3, the record area of the pilot signal is provided at both end portions and center portion of the record track, there is an advantage that even if the record track is, for example, curved, an excellent tracking can be carried out.

Furthermore, in the example shown in FIG. 5, as a method for providing the sampling pulses $S_1$ and $S_2$, there can be employed such a method which does not use the pulse PG but utilizes the fact that the level of the reproduced output $P_M$ of the pilot signal from, for example, the main track is higher than those of the reproduced outputs $P_R$ and $P_L$ of the pilot signals from the tracks at both sides of the main track. That is, the output $P_M$ is detected and on the basis of the detected output, the signals $S_1$ and $S_2$ are formed by employing a delay element such as a monostable multivibrator and the like.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. A method for recording a digital information signal in which an information signal is digitized and then recorded in a plurality of slant tracks on a recording medium by a pair of rotary heads having different respective azimuth angles, comprising the steps of:
   recording said digitized information signal in a first predetermined area of each of said slant tracks formed on said recording medium by said rotary head without a guard band between adjacent tracks;
   recording a tracking pilot signal in a portion of at least a second predetermined area of each of said plurality of slant tracks independently of said digitized information signal; and
   recording an erasing signal in another portion of each of said second predetermined areas where no tracking pilot signal is recorded, wherein said tracking pilot signals in said second predetermined areas of three adjacent tracks are arranged so as not to be sequentially encountered in a direction perpendicular to a tracking direction of said rotary head on said recording medium.

2. A method for recording a digital information signal according to claim 1, wherein said tracking pilot signal and said erasing signal are recorded in at least second predetermined areas at opposed ends of each of said plurality of slant tracks.

* * * * *